Aug. 29, 1967 P. ABRAMSON ETAL 3,339,022

TRANSISTOR CIRCUIT FOR RECEIVING DATA PULSES

Filed Dec. 16, 1963

INVENTORS
PAUL ABRAMSON
GEORGE R. STILWELL, JR.
ALBERT X. WIDMER
BY Edward G. Fiorito
ATTORNEY United States Patent Office 3,339,022
Patented Aug. 29, 1967

3,339,022

TRANSISTOR CIRCUIT FOR RECEIVING DATA PULSES

Paul Abramson, Yorktown Heights, George R. Stilwell, Jr., West Nyack, and Albert X. Widmer, Peekskill, N.Y., assignors to International Business Machines Corporation, New York, N.Y., a corporation of New York Filed Dec. 16, 1963, Ser. No. 330,929
11 Claims. (Cl. 178—69)

ABSTRACT OF THE DISCLOSURE

The present circuit is intended for use in systems for transmitting data pulses having a considerable DC component. A twin transformer is used to eliminate "common mode" noise or "cross-talk" induced on a pair of telephone lines by neighboring telephone circuits in a multi-wire cable. The unilateral nature of a transistor is utilized in each line to provide a small time constant for spurious pulses generated by the primary winding when the flux in the transformer collapses. The collector-base reverse impedance of the transistor is large during the generation of these spurious pulses causing the energy to be dissipated rapidly.

Figures 1, 2:
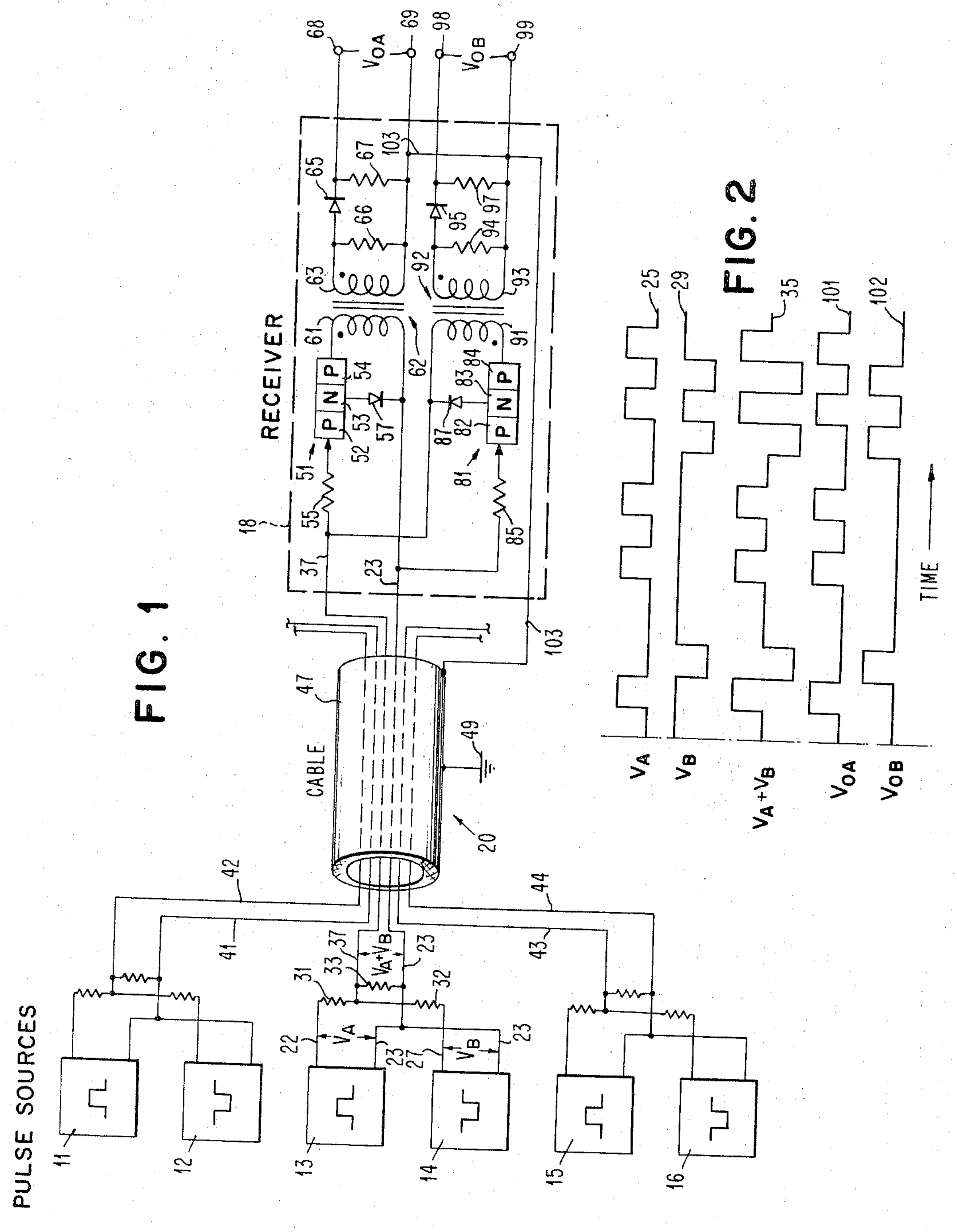

This invention relates to data transmission systems, and more particularly to a circuit for receiving data pulses transmitted through a cable containing many neighboring circuits carrying separate data pulses.

A number of problems arise when transmitting data over a plurality of circuits contained in a single cable, such as a telephone cable. Frequently the signals on one telephone circuit induce spurious signals on adjacent circuits resulting in the erroneous transmission of data. These spuriously induced signals are called "cross-talk" or "common mode" noise.

The latter term "common mode" is descriptive of this type of noise because it is induced with equal magnitude on both wires forming a telephone circuit. Therefore the difference in voltage between the pair of telephone wires is unchanged by the "common mode" noise.

One method of eliminating the "common mode" noise on a pair of telephone wires is to connect a transformer on the receiving end of the cable. According to the operation of a transformer, the output voltage represents only the difference in voltage between the pair of telephone wires, rather than the absolute magnitude of the voltage on the individual wires. Therefore the "common-mode" noise induced on both of the wires forming the telephone circuit is not reflected at the output of the transformer.

However, it has been found that undesirable side effects are encountered when using a transformer to eliminate the "common mode" noise from circuits carrying signals in the form of data pulses. The data pulse differs considerably from the usual audio signals. Ordinarily audio signals have no DC (direct current) component, while each data pulse contains a substantial DC component. Further, a number of data pulses may appear in a train causing a substantially continuous DC component to be fed to the transformer.

Considerable difficulty is encountered when data pulses having a DC component are applied to a transformer. The DC component in a data pulse causes the flux in the trannsformer to build up. When the pulse discontinues a rapid collapse of the flux induces a pulse of opposite polarity backward into the telephone circuit. This spurious pulse often causes erroneous operation of the data transmission system. The problem is even more acute where bi-polar pulses are used in the transmission of data. Here, both positive and negative data pulses are employed on the same pair of telephone wires. Therefore the collapse of the flux in a transformer in response to the application of a positve pulse produces a spurious negative pulse which is sent back into the telephone circuit where it may be misinterpreted as a negative data pulse.

Further, where a train of data pulses are received each having the same DC component, the level of the output voltage from the transformer shifts after a number of pulses are received. The devices utilizing the output of the transformer often employ threshold detectors which require stable signal levels at their inputs. Therefore the shift in signal level at the output of the transformer often causes erroneous operation of such utilization devices, or expensive, complicated modifications are required to compensate for the shift in signal level.

It is an object of the present invention to provide an improved data transmission system.

Still another object of the present invention is to provide an improved data transmission system employing a receiver circuit for eliminating "common mode" noise.

It is another object of the present invention to provide an improved receiver circuit employing a transformer to eliminate "common mode" noise and inhibit the backward flow of spurious pulses from the transformer.

A further object of the present invention is to provide a receiver circuit employing a transformer to eliminate "common mode" noise and capable of receiving a train of data pulses containing a DC component and providing an output signal having a constant signal level.

It is another object of the present invention to provide an improved data transmission system employing bi-polar data pulses.

It is a further object of the present invention to provide an improved circuit for separating bi-polar data pulses.

It is another object of the present invention to provide a receiver circuit capable of eliminating "common mode" noise on a pair of wires carrying bi-polar data pulses.

Still another object of the present invention is to provide an improved receiver circuit employing transformers to eliminate "common mode" noise on a pair of wires carrying bi-polar data pulses.

These and other objects are accomplished in accordance with the present invention by providing a transistor which couples a pair of telephone wires to the primary winding of a transformer. The unilateral nature of the transistor is employed to prevent the backward flow of spurious pulses caused by the collapse of flux in the transformer. This is accomplished by coupling the pair of telephone wires across the emitter and base of the transistor. The primary winding of the transformer is coupled across the collector and base of the transistor. The spurious signals induced by the collapse of the flux in the transformer are met by the high reverse-impedance between the collector and base of the transistor preventing the backward flow of spurious pulses.

In accordance with another aspect of the present invention a second transistor is added similarly connected to a second transformer. The connections are arranged so that when bi-polar pulses are received, one transistor responds to positive pulses while the other responds to negative pulses. Also two diodes are connected to the secondary windings of the transformers. The diodes are oriented so that they pass current in a direction corresponding to the flow of current in the primary winding produced by conduction of the associated transistor.

When the input pulse termminates the flux in the secondary winding of the transformers collapses causing a signal which opposes the forward direction of current flow through the diode. Therefore a high impedance is presented to the secondary windings of the transformers at this time. The high impedance at the secondary windings of the transformers occurs simultaneously with the high impendance at the primary winding of the transformers causing the flux to collapse rapidly. Due to the quick recovery of the transformer between each data pulse received, the output signal level remains constant. Further, the data pulses can be spaced closer together improving the capacity of the data transmission system.

Another advantage of the present invention is that information can be transmitted over each pair of wires in the form of both positive and negative data pulses, thereby increasing the amount of information that can be carried over the pair of wires.

Still another advantage of the present invention is that "common mode" noise is eliminated without the use of any power supplies at the receiver.

Two other advantages are obtained from the use of a transformer in the receiver. First, the telephone cable is isolated and protected from power failures or excess voltages generated by the equipment utilizing the data pulses. Second, with no additional hardware the negative portion of the bi-polar pulses can be inverted so that the two data signals provided by the receiver are in the form of positive uni-polar pulses.

The foregoing and other objects, features and advantages of the invention will be apparent from the following more particular description of a preferred embodiment of the invention, as illustrated in the accompanying drawings.

In the drawings:

FIG. 1 is an electrical schematic illustrating a transmission system embodying the present invention; and FIG. 2 is a waveform diagram illustrating the voltage levels at various points in the system of FIG. 1.

The data transmission system shown in FIG. 1 illustrates the manner in which the present invention is employed. A group of pulse sources 11–16 is shown at the transmitting end of the system. A receiver 18 is shown at the other end of the system. The data pulses from sources 11–16 are carried through a cable 20. The receiver 18 operates in response to pulses from sources 13 and 14. Other receivers, not shown, operate in response to the remaining pulse sources.

As illustrated by the symbol in the pulse source 13, positive data pulses are provided by source 13. The pulses appear as a voltage $V_A$ between a pair of lines 22 and 23. A typical output voltage $V_A$ is illustrated in FIG. 2 by a waveform 25.

One of the two output lines of pulse source 14 is connected to line 23. The output of pulse source 14, labeled $V_B$ in FIG. 1, appears between line 23 and a line 27. A waveform 29 in FIG. 2 illustrates a typical output from pulse source 14.

The pulse sources 13 and 14 operate independently and each produce a separate train of uni-polar data pulses. The timing of the pulse sources 13 and 14, as well as the remaining pulse sources, is arranged so that the positive pulses do not overlap the negative pulses.

The voltages on lines 22 and 27 are mixed by a group of resistors 31–33. The results of this mixing operation are illustrated by a waveform 35 in FIG. 2. The combined data pulses are represented by the symbols $V_A+V_B$ appearing between line 23 and a line 37. The mixing resistors 31–33 perform the function of adding the waveforms 25 and 29. The resulting waveform 35 is in the form of a bi-polar train of data pulses. The positive pulses represent the information generated by pulse source 13, while the negative portion of the bi-polar waveform 35 represents the independent information generated by pulse source 14. The waveform 35 does not represent the absolute voltage on either of the lines 23 or 37; the difference in voltage between lines 23 and 37 is represented.

In the same manner bi-polar pulse trains are generated on another group of lines 41–44. All of the lines 23, 37, and 41–44 are placed together in cable 20. The cross-section of cable 20 is exaggerated so that the lines contained therein are easily identified in FIG. 1. A shield 47 is shown wrapped about the lines 23, 37 and 41–44. The shield 47 is clamped to a reference potential 49, typically ground.

Due to the close confinement of the lines 23, 37 and 41–44 within the cable 20, "common mode" noise is coupled from one line to another. For example the voltage on line 41 induces a signal on the remaining lines 23, 37 and 42–44. This induced signal could be readily detected by measuring the voltage difference between the grounded shield 47 and any of the lines 23, 37 and 42–44. The magnitude of the induced voltage on any pair of the lines 23, 37 and 42–44 is approximately the same. Of course the distance from the line 41 effects the magnitude of the signal induced into the neighboring line. However it has been found that the "common mode" noise induced in a pair of lines such as lines 23 and 37 is substantially equal. That is the "common mode" noise induced on lines 23 and 37 when measured with respect to the grounded shield 47, is substantially equal in magnitude. Therefore the difference in voltage between the lines 37 and 23 remains uneffected by the "common mode" noise.

The receiver 18 performs the function of examining the difference in voltage between the lines 23 and 37 rather than examining the voltage on the individual lines 23 and 37 with respect to a reference potential such as ground 49. In this manner the "common mode" noise induced on lines 23 and 37 is eliminated.

The receiver 18 includes a PNP type transistor 51 having an emitter electrode 52, a base electrode 53 and a collector electrode 54. The line 37 is coupled to the emitter 52 through a resistor 55. Line 23 is coupled to base 53 by a diode 57. The diode 57 is oriented to conduct current away from the base 53 corresponding to the direction of current flow out of base 53 during conduction of transistor 51.

In operation when positive pulses appear on lines 23 and 37 the junction between emitter 52 and base 53 is positively biased causing the transistor 51 to conduct. The potential drop across diode 57 prevents conduction of transistor 51 in response to positive voltages on lines 23 and 37 below a minimum threshold value. Resistor 55 in conjunction with diode 57 produces a clamping action which standardizes the pulse amplitude in winding 61, thereby eliminating variations in pulse amplitude due to losses in lines 23 and 37.

When the transistor 51 conducts, current flows through a primary coil 61 of a transformer 62 thereby inducing a current flow in a secondary winding 63. The dots placed near the ends of windings 61 and 63 indicate the direction of current flow within the transformer 62. When current flows into the end of the coil 61 near the dot, current flows out of the coil 63 at the end near the dot. A diode 65 is connected in series with the secondary winding 63 and oriented so that the forward direction of current flow corresponds to the direction of current flow through transistor 51 into coil 61. A damping resistor 66 is connected across the secondary winding 63. The function of the resistor 66 is described below in connection with the cut-off operation of the transformer 62. Another resistor 67 is connected across a pair of output terminals 68 and 69. The resistor 67 is used to provide the terminating load on the receiver 18 and may be adjusted in accordance with the type of utilization device, not shown, connected to output terminals 68 and 69.

When the transistor 51 cuts off the flux developed in transformer 62 collapses reversing the voltage across the windings 61 and 63. During the collapse of the flux in transformer 62 the collector 54 is at a more negative potential than the base 53, thereby reverse biasing the junction therebetween. In this state a high impedance is presented by the transistor 51 resisting the backward flow of current through to line 37. Further, the collapse of the flux in winding 61 occurs rapidly due to the high impedance presented by transistor 51.

This may be seen readily by considering the time constant of the circuit which is given by L/R, where L is the magnetizing inductance of transformer 62 and R is the resistance presented by transistor 51 in parallel with the resistance reflected to primary winding 61. Since the resistance presented by transistor 51 is large when the junction between collector 54 and base 53 is reverse biased, the time constant is reduced. Therefore the decay of the flux in winding 61 may be made to occur very rapidly.

At the same time that the flux collapses in primary winding 61 in response to the cut-off of transistor 51, the flux collapses in secondary winding 63. This generates a voltage opposite to that provided during the conduction of transistor 51. The voltage generated by the collapse of flux in coil 63 reverse biases diode 65 dropping the voltage between output terminals 68 and 69. Resistor 66 is provided to dissipate the energy stored in coil 63. By making resistor 66 large, the time constant of the circuit including winding 63 can be made very short in duration thereby causing the rapid disspiation of the flux in winding 63.

When the transistor 51 begins conducting the buildup of flux in coils 61 and 63 occurs very rapidly since the resistance presented by transistor 51 during conductivity is very small and the resistance of the diode 65 biased in the forward direction is also small. Therefore the circuit is capable of rapidly turning on and turning off permitting the data pulses to be spaced very close together.

Also included in receiver 18 is a transistor 81 having an emitter 82, base 83 and collector 84. A resistor 85 couples the emitter 82 to line 23. A diode 87 couples the base 83 to line 37. A primary winding 91 of a transformer 92 is coupled across the collector 84 to the base 83 through diode 87. A secondary winding 93 has a damping resistor 94 connected directly thereacross, and a diode 95 connected in series therewith. A load resistor 97 is connected across a pair of output terminals 98 and 99.

When negative signals appear at lines 23 and 37, i.e., 37 is more negative than 23, transistor 81 conducts. Current flow into the end of winding 91 near the dot creates a current flow out of the end of winding 93 near the dot. The forward direction of current flow through diode 95 corresponds to the direction of current flow through transistor 81. The collapse of flux in windings 91 and 93 reverse biases the collector-base junction of transistor 81 and reverse biases diode 95. Transformer 92 recovers rapidly in the same manner as transformer 62 described above. However the secondary winding 93 is reversed with respect to the primary winding 91 so that the negative signals on primary winding 91 are inverted and produce positive pulses at the output terminals 98 and 99.

Due to the blocking of spurious negative signals caused by the collapse of flux in winding 61, these signals do not sneak back into lines 23 and 37 where they would cause transistor 81 to conduct. In the same manner spurious signals from winding 91 do not cause transistor 51 to conduct producing an erroneous output.

The voltage between terminals 68 and 69 is designated $V_{OA}$ and represented by a waveform 101 in FIG. 2. The waveform 101 is identical to waveform 25 in FIG. 2. The voltage between output terminals 98 and 99 is designated $V_{OB}$ and illustrated by a waveform 102 in FIG. 2. The waveform 102 is the inverted form of waveform 29. A line 103 is shown connected between the shield 47 and output terminals 69 and 99. The line 103 is used to reference the output signals $V_{OA}$ and $V_{OB}$ with respect to ground 49. Although the output signals are referenced to ground at this point, no "common mode" noise is injected into the output signals by such an interconnection. The transformers 62 and 92 isolate the output from the "common mode" noise on lines 23 and 37 thereby preventing the appearance of this signal at the output terminals.

Although receiver 18 employs PNP type transistors 51 and 81, NPN type transistors could be substituted with a rearrangement of the diodes, 57, 87, 65, and 95. Further, either one of the transistors 51 or 81 could be replaced with an NPN type transistor. In this latter modification the connection of lines 23 and 37 to the transistor would have to be altered. For example if transistor 81 were replaced with an NPN type transistor, then line 37 would be coupled to the emitter 82 and line 37 would be coupled to the base 83 through diode 87. The connections to transistor 51 would remain the same.

In accordance with another modification of the present invention the diodes 57 and 87 could be replaced with a linear impedance, such as a resistor, in which case resistors 55 and 85 would be eliminated.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. Apparatus for eliminating "common mode" noise from a train of data pulses appearing as the difference in voltage between a first and a second input line, said pulses containing a substantial DC component, comprising:

a transistor having a base, an emitter and a collector electrode;

a first diode connected in series with said base and oriented to permit current flow in the direction causing conduction of said transistor;

a transformer having a primary winding and a secondary winding, said primary winding being connected across said first diode and said collector electrode;

means coupling said first input line to said emitter electrode and coupling the second input line to the connection between said first diode and said primary winding; and a second diode connected in series with said secondary winding and oriented to pass pulses of a polarity type corresponding to the type passed to the primary winding of said transformer.

2. Apparatus as defined in claim 1 further characterized by the addition of a damping resistor connected across said secondary winding.

3. Apparatus for separating bi-polar pulses appearing as the difference in voltage between a first and a second input line, comprising:

a first and a second transistor each having a base, an emitter, and a collector electrode;

a first and a second transformer, said first transformer being coupled across the base and collector electrodes of said first transistor, and said second transformer being coupled across the base and collector electrodes of said second transistor; and means coupling said first input line to the emitter electrode of said first transistor and the base electrode of said second transistor, and coupling the second input line to the base electrode of said first transistor and the emitter electrode of said second transistor.

4. Apparatus for separating bi-polar pulses appearing as the difference in voltage on a first and a second input line, comprising:

a first and a second transistor each having a base, an emitter, and a collector electrode;

a first and a second transformer each having a primary and a secondary winding, the primary winding of said first transformer being coupled across the base and collector electrodes of said first transistor, and the primary windings of said second transformer being connected across the base and collector electrodes of said second transistor;

means coupling the first line to the emitter of said first transistor and the base of said second transistor, and coupling said second input line to the base of said first transistor and the emitter of said second transistor; and a first and a second unilateral conducting means connected to the secondary windings of said first and second transformers respectively, the orientation of said first and second unilateral conducting means being selected to permit current flow in response to the conduction of said first and second transistors respectively.

5. Apparatus as defined in claim 4 wherein said first and second unilateral conducting means are diodes connected in series with the secondary windings of said first and second transformers respectively.

6. Apparatus as defined in claim 5 further characterized by the addition of a first and second damping resistor connected directly across the secondary windings of said first and second transformers respectively.

7. Apparatus as defined in claim 6 wherein said base electrodes include unilateral conducting means permitting current flow only in the direction causing conduction of the associated transistor.

8. Apparatus for separating bi-polar pulses on a pair of input lines, comprising:

pair of transformers each having a primary and secondary winding, a first side of each of said primary windings being connected to opposite ones of said input lines, a pair of transistors each having a base, an emitter and a collector electrode, means connecting said transistors in series, emitter to collector, between opposite ones of said input lines and the second side of each of said primary windings, and biasing means connected between the base of each transistor and the other input line from that to which each transistor is connected whereby each transistor will be rendered conductive by input pulses of opposite polarity types.

9. Apparatus as set forth in claim 8 wherein said biasing means comprises a separate diode connected between the base of each transistor and the opposite side of the input lines.

10. Apparatus as set forth in claim 9 including a resistor connected in series between each of said transistors and said input lines.

11. Apparatus as set forth in claim 8 including unidirectional current carrying means connected in series with each of said secondary windings whereby only pulses of a desired polarity will pass therethrough.

References Cited

UNITED STATES PATENTS 3,165,584 1/1965 Thornton et al. ------- 178—68

NEIL C. READ, *Primary Examiner.*

THOMAS A. ROBINSON, *Examiner.*